(12) United States Patent
Wenzel

(10) Patent No.: US 7,827,441 B1
(45) Date of Patent: Nov. 2, 2010

(54) DISK-LESS QUORUM DEVICE FOR A CLUSTERED STORAGE SYSTEM

(75) Inventor: Thomas Rudolf Wenzel, Almere (NL)

(73) Assignee: Network Appliance, Inc., Sunnyvale, CA (US)

( * ) Notice: Subject to any disclaimer, the term of this patent is extended or adjusted under 35 U.S.C. 154(b) by 360 days.

(21) Appl. No.: 11/929,581

(22) Filed: Oct. 30, 2007

(51) Int. Cl.
  *G06F 11/00* (2006.01)
  *G06F 11/20* (2006.01)

(52) U.S. Cl. .............. 714/9; 714/10; 714/13; 711/130; 711/131

(58) Field of Classification Search .......... 714/9, 714/10, 13; 711/130, 131
See application file for complete search history.

(56) References Cited

U.S. PATENT DOCUMENTS

| | | | | |
|---|---|---|---|---|
| 4,351,023 A | * | 9/1982 | Richer | ............ 700/82 |
| 5,432,922 A | * | 7/1995 | Polyzois et al. | ............ 714/6 |
| 5,533,190 A | * | 7/1996 | Binford et al. | ............ 714/6 |
| 5,548,711 A | * | 8/1996 | Brant et al. | ............ 714/5 |
| 5,555,371 A | * | 9/1996 | Duyanovich et al. | ............ 714/13 |
| 5,893,140 A | * | 4/1999 | Vahalia et al. | ............ 711/118 |
| 6,381,674 B2 | * | 4/2002 | DeKoning et al. | ............ 711/113 |
| 6,460,122 B1 | * | 10/2002 | Otterness et al. | ............ 711/154 |
| 6,484,234 B1 | * | 11/2002 | Kedem | ............ 711/113 |
| 6,988,219 B2 | * | 1/2006 | Hitz et al. | ............ 714/6 |
| 7,191,262 B2 | * | 3/2007 | Sleeman | ............ 710/62 |
| 2004/0024973 A1 | * | 2/2004 | Chron et al. | ............ 711/144 |
| 2008/0282105 A1 | * | 11/2008 | Deenadhayalan et al. | ............ 714/6 |

* cited by examiner

*Primary Examiner*—Scott T Baderman
*Assistant Examiner*—Joseph Schell
(74) *Attorney, Agent, or Firm*—Blakely, Sokoloff, Taylor & Zafman LLP

(57) ABSTRACT

A disk-less quorum device in a clustered storage system includes non-volatile memory to store status information regarding the cluster and each storage controller in the cluster. The quorum device maintains a bitmap, shared by the controllers in the cluster, in the non-volatile memory. The bitmap indicates the status of a write operation to any data block or parity block. A "dirty" data unit in the bitmap indicates that a write operation has been submitted but is not yet finished. Upon submitting a write request (to update a data block or a parity block) to the storage facility, a controller sets the corresponding data unit "dirty" in the bitmap. After receiving an acknowledgement from the storage facility indicating that the operation has been completed, the controller clears the corresponding data unit. If a controller fails during a write operation, another controller can use the bitmap to re-establish data consistency.

25 Claims, 7 Drawing Sheets

DISK-LESS QUORUM DEVICE FOR A CLUSTERED STORAGE SYSTEM

FIELD OF THE INVENTION

At least one embodiment of the present invention pertains to network data storage systems, and more particularly, to a clustered data storage system.

BACKGROUND

In the field of network data storage, a clustered data storage system links multiple controllers to provide redundancy of storage access. FIG. 1 shows an example of a clustered data storage system. As shown, the system includes multiple controllers 1. Each controller 1 is coupled locally to a storage facility 2. The storage facility 2 is managed by each of the controllers 1. The storage facility 2 may be, for example, one or more conventional magnetic disks, optical disks such as CD-ROM or DVD based storage, magneto-optical (MO) storage, or any other type of non-volatile storage devices suitable for storing large quantities of data. The storage facility 2 can be organized as one or more Redundant Array of Independent Disks (RAID) groups, in which case each controller 1 accesses the storage facility 2 using an appropriate RAID method.

A controller 1 receives and responds to various read and write requests from a host (not shown in FIG. 1), relating to volumes, Logical Unit Numbers (LUNs), files, and/or other logical containers of data stored in (or to be stored in) the storage facility 2. If one of the controllers 1 fails, another controller 1 can take over for the failed controller 1 without sacrificing performance.

Each of the controllers 1 is also coupled to a quorum device 4 via a network 3, which may operate based on a conventional protocol such as InfiniBand or Fibre Channel, Internet Protocol (IP), or other protocol(s). A quorum device, such as quorum device 4 in FIG. 1, is a device that stores state information regarding the cluster and each controller 1 in the cluster, including identification of nodes in the cluster, which nodes are active (or should be active), which nodes are not active, etc. In a conventional technique, the quorum device 4 is implemented with a disk-based storage device ("disk"). Data stored on the disk is frequently updated to reflect the current status of each controller 1. However, each access to a quorum disk is time consuming, such that accesses to the disk decrease the clustered storage system's throughput and performance.

In addition, in one known technique a clustered storage system such as shown in FIG. 1 uses non-volatile random access memory (NVRAM) to ensure data integrity in the event of a failure of one or more controllers 1. Each controller 1 has an NVRAM to store a log of each write request and the associated write data received at the controller 1 from a host. Such log data, which is sometimes called "NVLog", is also transmitted by the controller 1 that creates it to one or more other controllers 1 in the cluster. Thus, each controller 1 has a local copy of the NVLog of another controller 1. Therefore, if one of the controller 1 fails before completion of a particular write request, a different controller 1 can re-submit the write request to ensure data integrity, by using its local copy of the failed controller's NVLog.

However, transmitting each write request between the controllers 1 in order to share NVLogs incurs substantial network traffic, thus decreasing the clustered storage system's throughput and performance. Even in the case of a very simple clustered system that has only two controllers, a first controller's sending a write request and data to the other controller doubles the load on the first controller in connection with that write request. In a larger cluster, the load would increase geometrically with each additional controller to which the first controller needs to send its received write requests and data.

SUMMARY OF THE INVENTION

One aspect of the invention is a method of responding to a failure in a clustered storage system which includes a plurality of storage controllers configured as failover partners, where the failure has caused a write operation by a first storage controller to fail to complete, and the write operation was initiated in response to a write request from a host, the write request requesting that a set of data be written. The method includes completing the write operation from a second storage controller of the plurality of storage controllers without using any log of the set of data and without requiring any communication from the first storage controller to the second storage controller.

Another aspect of the invention is a storage controller and/or other apparatus that can perform the method.

Yet another aspect of the invention is a quorum device for use in a clustered storage system, the quorum device including a memory and a network interface. The memory is to store a data structure corresponding to a storage device in the clustered storage system, where the data structure includes a separate data unit for each of a plurality of storage blocks in the storage device. Each data unit indicates whether a write operation is pending for the corresponding storage block. The apparatus receives updates of the data structure, through the network interface, from a plurality of external storage controllers that can access the storage device.

Still another aspect of the invention is a method corresponding to the functionality of said quorum device.

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

Figure 1:
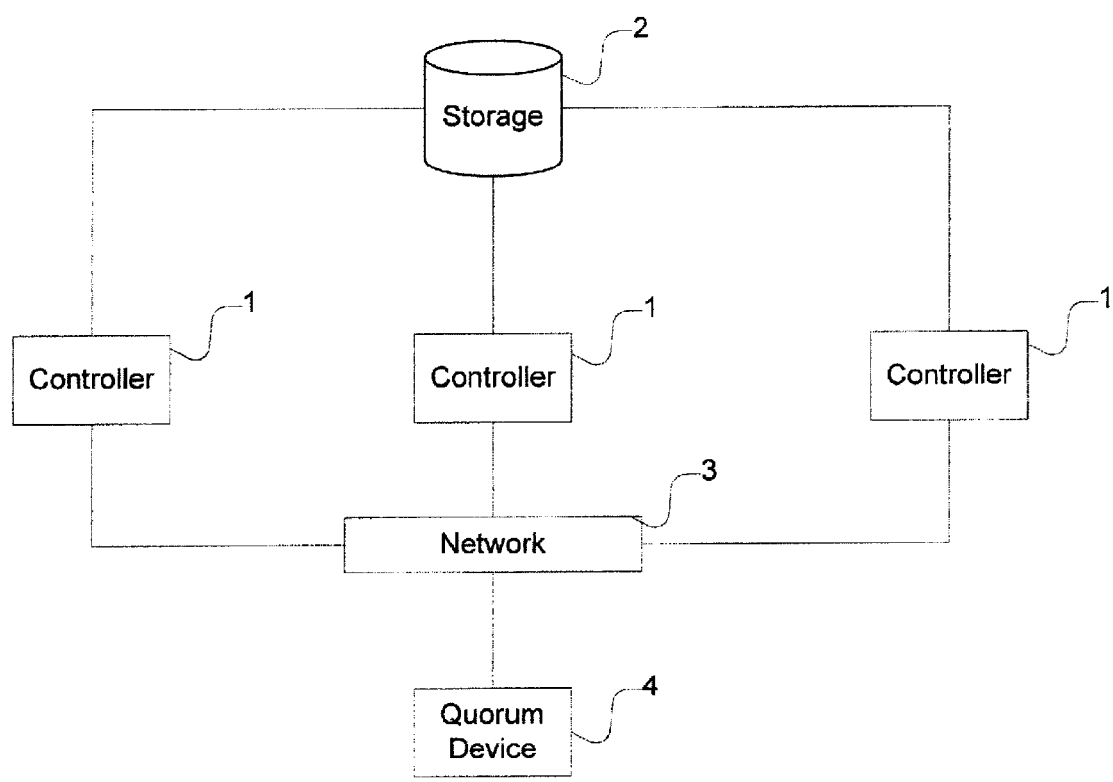
FIG. 1 is an example of a clustered storage system.

A method and system of using disk-less quorum device in a clustered storage system are described. References in this specification to "an embodiment", "one embodiment", or the like, mean that the particular feature, structure or characteristic being described is included in at least one embodiment of the present invention. Occurrences of such phrases in this specification do not necessarily all refer to the same embodiment.

The present invention includes a technique of using a disk-less quorum device for a clustered storage system. In one embodiment, the disk-less quorum device includes non-volatile memory to store not only the usual state information regarding the cluster and each controller in the cluster, but also write status information for individual blocks in a storage facility. This approach eliminates the need to maintain NVLogs (logs which store the write data) and eliminates the need to communicate write requests and data between controllers in a cluster (either directly or indirectly).

In particular, the disk-less quorum device stores in NVRAM a bitmap shared by all of the controllers in a cluster, which indicates the status of write operations to data blocks and parity blocks. In one embodiment, the bitmap includes a separate data unit (e.g., a bit or a predetermined number of bits) for each data block and each parity block in the storage system and for the currency of data/parity. Each such data unit indicates whether a write operation is pending for the corresponding block. Upon submitting a write request to a storage facility to update a data block or a parity block, a controller sets the corresponding data unit in the bitmap in the quorum device (sometimes called setting the data unit "dirty"). After receiving an acknowledgement from the storage facility that the write operation has been successfully completed, the controller clears that data unit (sometimes called setting the data unit "clean"). What is meant by "completed" or "completion" of a write request in this context is that the data has been successfully written to the storage facility. If a controller fails during a write operation, another controller can use the information in the bitmap to re-establish data consistency.

This technique has several advantages over the prior approaches described above. For example, because the disk-less quorum device is physically separate from the controllers and the storage facilities, it is less likely to be affected if a controller or storage device fails. If any particular controller needs to be replaced, the pending write status information will not be lost. Further, in contrast with the prior technique of maintaining NVLogs and communicating write requests between controllers, this technique requires no NVLogs (log of write data) be maintained at all, while providing at least the same level of failure protection. And, because write requests and data do not need to be communicated between controllers in a cluster, much less data needs to be transferred between devices, thereby reducing network bandwidth consumption and processing load on the controllers. Further, the disk-less quorum device is implemented with NVRAM, which in general is much faster at handling input (I/O) operations than disk devices.

Figure 2:
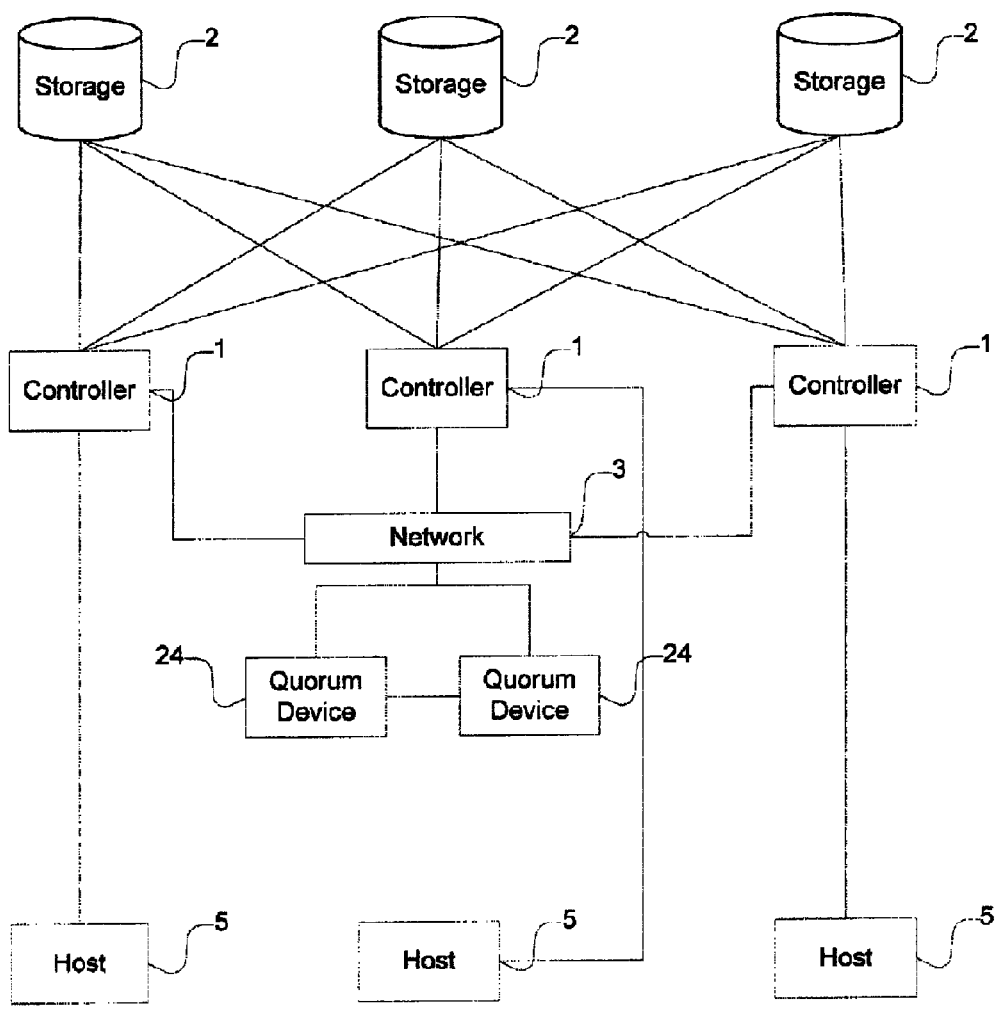
FIG. 2 illustrates a clustered storage system, according to an embodiment of the present invention.

FIG. 2 illustrates a clustered storage system, according to an embodiment of the present invention. As shown, the clustered storage system includes a number of controllers 1. Each of the controllers 1 can be, for example, a storage server, such as a file server, a block-level storage server, or a combination thereof. Each controller 1 is coupled locally to each of a plurality of storage facilities 2 (e.g., disks, RAID groups or other type of storage devices). A controller 1 receives and responds to various read and write requests from a particular host 5 or set of hosts 5, relating to volumes, LUNs (Logical Unit Numbers), files, and/or other data units stored in (or to be stored in) the storage facilities 2. Each storage facility 2 may be, for example, one or more conventional magnetic disks, optical disks such as CD-ROM or DVD based storage, magneto-optical (MO) storage, or any other type of non-volatile storage devices suitable for storing large quantities of data. Each storage facility 2 can be organized as one or more RAID groups, in which case each controller 1 accesses a storage facility 2 using an appropriate RAID method.

Each of the controllers 1 is coupled to a quorum device 24 via a storage network 3 (e.g., InfiniBand, Fibre Channel, etc.). Each controller 1 can use a conventional protocol to communicate with the quorum device 24, such as Fibre Channel Protocol (FCP), Internet Small Computer System Interface (iSCSI), Internet FCP (iFCP), InfiniBand, or any other protocol(s) suitable for storage access. In one embodiment, a quorum device 24 is disk-less, such that its internal storage space is implemented, for example, using NVRAM. Data stored in a quorum device 24 can be, therefore, accessed much faster than a disk-based quorum device.

A quorum device 24 may include an internal memory controller (not shown), through which controllers 1 can access the internal NVRAM of the quorum device 24. In other embodiments, however, a quorum device 24 does not include an internal memory controller. In such an embodiment, the memory (e.g., NVRAM) within the quorum device 24 may be directly accessible to external devices such as the controllers 1 in the cluster, by using, for example, remote direct memory access (RDMA).

In one embodiment, the clustered storage system has two quorum devices 24, i.e., a primary quorum device and backup quorum device, as shown in FIG. 2, with mirrored NVRAM. In this embodiment, the primary quorum device may be normally active while the backup quorum device is normally passive. In that case, the backup quorum device stores exactly the same data as the primary quorum device in their respective NVRAMs. If the primary quorum device fails, the backup quorum device provides the ability to recover the data in the failed quorum device.

Alternatively, this configuration might not use mirrored NVRAM, in which case the controllers 1 need to update the state of all requests in the backup quorum device in case the active quorum device fails. Note that a fallback option for a controller 1 in the event both (all) quorum devices 24 fail is to use the storage 2 as disk-based quorum.

A quorum device 24 stores vital data, including information indicating the state of each controller 1 in the cluster. In one embodiment, a quorum device 24 also includes and maintains a bitmap indicating each and every pending, executing, and/or confirmed write request received at any of the controllers 1 from any of the hosts 5, to keep track of the state of the write operations. This bitmap can be used for recovery in the event of a failure.

A quorum device 24 can be accessed from more than one controller 1. Because the quorum device 24 is external to the controllers 1, adding or removing a controller 1 from the cluster only requires simple reconfiguration of the quorum device 24 (or possibly the storage facility 2, depending on the implementation, e.g., maximum number of controllers 1, etc.). The storage space of the quorum device 24 may be partitioned based on any of various criteria, such as controller, storage device, device access, and/or failover capability.

Figure 3:
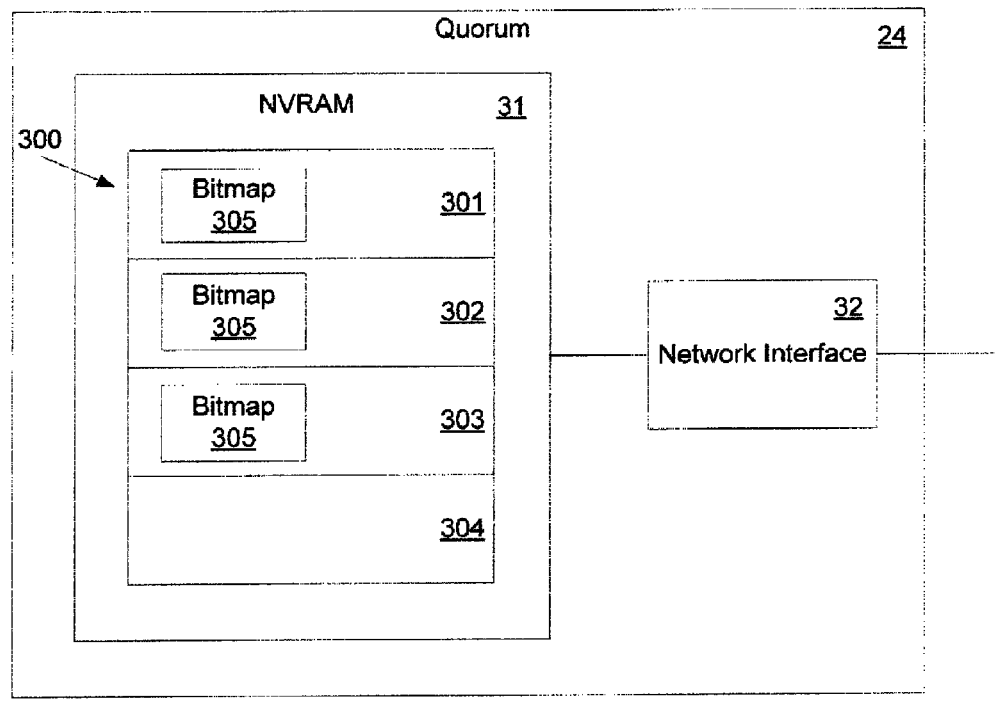
FIG. 3 illustrates an example of a quorum device according to an embodiment of the present invention, including a partitioning of the quorum device's storage space.

FIG. 3 illustrates an example of a quorum device according to an embodiment of the present invention, including a partitioning of the quorum device's storage space. In the illustrated embodiment, the quorum device includes NVRAM 31 and a network interface 34 through which external storage controllers 1 can access the NVRAM 31. The network interface 34 may be, for example, any conventional type of network interface, such as an Ethernet adapter, Fibre Channel adapter, InfiniBand adapter, or the like.

The storage space 300 of the quorum device 24 is implemented within NVRAM 31 in the quorum device 24. To facilitate description it is assumed that the clustered storage system has three controllers 1 and three storage facilities 2. Hence, as shown, the quorum device's storage space 300 is divided into four sections 301, 302, 303, and 304. Each of the sections 301-303 is reserved for a different one of the three storage facilities 2. The cluster details section 304 is reserved for storing data regarding the state of the cluster, including the state of each controller 1. Each of the sections 301-303 stores a bitmap 305 indicating, for each block of the corresponding storage facility 2, whether a write request is pending or done. In one embodiment, each bitmap 305 is variable in size, but the size is the same for all bitmaps 305 in the system. Each bitmap 305 includes information indicating the current owning controller 1 and state information regarding the write requests from that controller.

In one embodiment, each bitmap 305 includes a separate data unit for each data block and each parity block in the associated storage facility and information regarding the relative currency of data and parity. The data units in the bitmap may each be a single bit or a predetermined number of bits, for example. To facilitate explanation, the term "bit" is used henceforth in this description to refer to each such data unit; however, it should be understood that the term "bit" is intended to mean a data unit of any length.

Figure 4:
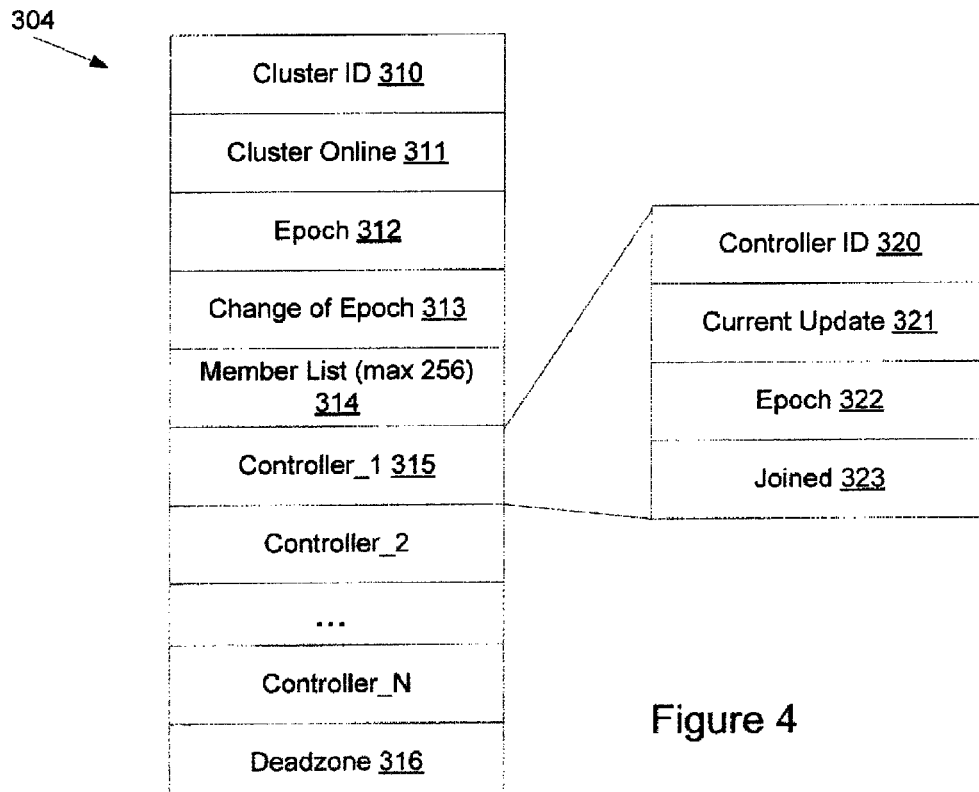
FIG. 4 illustrates an example of the details section 304 shown in FIG. 3, according to an embodiment of the present invention.

FIG. 4 illustrates an example of the cluster details section 304. As shown, section 304 includes a cluster ID field 310 to record the identifier (ID) of the cluster. The cluster online field 311 stores the time the cluster was brought online. The epoch 312 is a field which is incremented every time the state of the cluster changes. A change may be, for example, bringing the cluster online, joining or leaving of a controller 1, etc. Change of epoch 313 records the last point in time the epoch 312 was changed. Member list 314 stores IDs of a list of controllers 1 and the location within section 304 storing each controller's status information. For example, section 315 stores status information of Controller_1.

In further detail, section 315 includes a controller ID field 320, a current update field 321, an epoch field 322, and a joined field 323. The current update field 321 is the time when this controller most recently updated its own status. This field is used to compare against the other time values to determine whether this controller does periodic updates. If a controller 1 fails, it will cease to update its current update field 321 in the quorum device 31. Accordingly, if the controller has not updated its status for a certain amount of time, the quorum device will declare this controller non-operational and update the deadzone field 316, which is described below. The epoch field 322 is compared with the cluster's epoch field 312 to make sure that the two epochs' values are the same. If the values are different, that means the controller has not been updated to get the most recent status information regarding the cluster. Joined field 323 stores the time the controller joined the cluster. Additional fields may also be present in section 315, depending on type of implementation.

The deadzone field 316 is a field that includes an identifier of any controller that is to be disabled from the cluster due to, for example, faulty or offensive behavior of the controller, loss of connectivity, missing periodic updates, etc. When the quorum device determines that the current update field 321 of a controller 1 has not been updated for more than a specified period of time, it will update the deadzone field 316 to identify that controller, resulting in the controller being logically removed from the cluster. The deadzone field 316 may also include a code indicating the reason. Controllers 1 check this field periodically and on startup, in response to cluster changes, etc., to make sure they are allowed to stay online.

Figure 5:
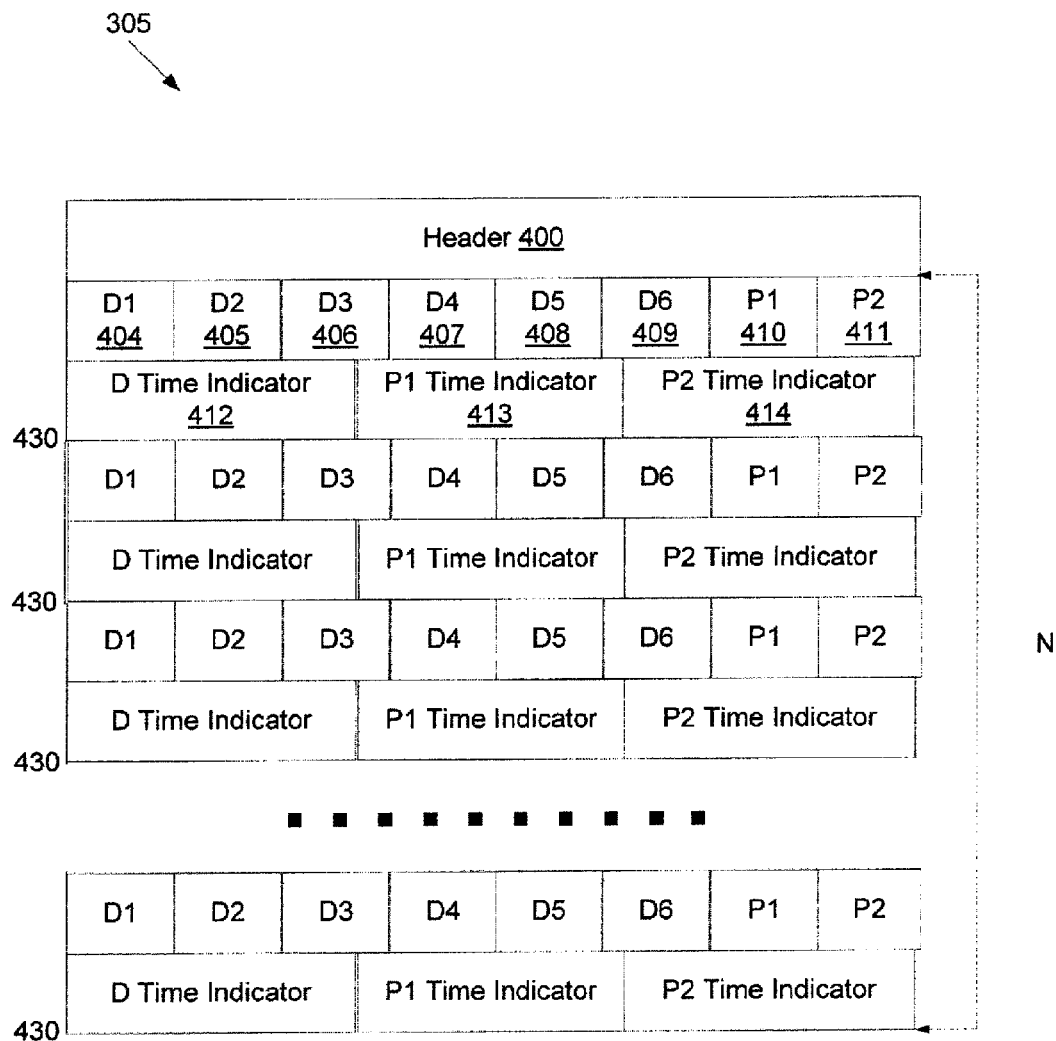
FIG. 5 illustrates an example of the details of a bitmap 305 shown in FIG. 3, according to an embodiment of the present invention.

FIG. 5 illustrates an example of the details of a bitmap 305 shown in FIG. 3. FIG. 5 only shows a portion of the bitmap 305. The illustrated example of the bitmap 305 is based on a configuration in which a RAID-6 parity scheme is used to organize the data/parity blocks and each stripe includes six data blocks, D1, D2, . . . , D6. Note, however, that this particular configuration is discussed here only for purposes of illustration.

RAID-6 uses two independent parity blocks, P1 and P2, for each stripe, which are calculated based on the very same blocks but using different algorithms: For example, P1 may be calculated as an exclusive OR (XOR) while P2 is calculated as a Reed-Solomon (RS) encoding. Note, however, that the technique being introduced here can also be used with redundancy schemes other than RAID-6, such as one in which each stripe has only a single parity block, or some other number of parity blocks. Hence, the bitmap 305 will have a single field or a number of fields analogous to P1 and P2, depending on the redundancy scheme being used. Furthermore, computation of parity based on XOR and/or RS encoding is just an example; the particular algorithm by which parity is calculated is not germane to the technique being introduced here.

In the embodiment illustrated in FIG. 5, for each number N of stripes in a given storage facility 2, the bitmap 305 includes a header section 400 and N stripe information sections 430. The header section 400 records information such as the owner of the N stripes of data blocks, for the purpose of determining whether a write request from a controller 1 (shown in FIG. 2) should be authorized (e.g., to prevent concurrent access to the storage facility 2 by different controllers). Each stripe information section 430 represents a stripe of a RAID array. Each of the fields 404-409 represents a data block in a stripe. Field 410 represents a first parity block P1 of the stripe and the field 411 represents a second parity block P2 of the stripe. In one embodiment, each of the fields 404-411 comprises a single bit. A "1" value of one of the fields 404-409 indicates that a write operation on the corresponding data block is pending. A "1" value of P1 or P2 indicates the corresponding parity block is being updated. In one embodiment, P1 is computed as an XOR of the data blocks in the stripe (D1, D2, D3, D4, D5, D6) and P2 is computed as a Reed-Solomon encoding of those data blocks. Upon changing of any of the data blocks D1-D6, P1 and P2 will be recomputed.

In one embodiment, the D time indicator field 412 indicates the time a data block of the corresponding stripe is updated; the P1 time indicator field 413 indicates the time P1 is updated; and the P2 time indicator field 414 indicates the time P2 is updated. These time indicator fields 412-414 are collectively called "currency information" herein. By examining this currency information, a controller can determine the order in which a data block, P1, and P2 were updated for a given stripe in response to a write request. This information can be used in the event of a failure or an incomplete write, to determine whether data and/or parity are correct as stored on disk. For example, if a failure occurs while processing multiple write requests to the same stripe, and at least one write but not all of them has been acknowledged to the host before the failure occurred, then some data in the stripe may be dirty; therefore, it is necessary to determine which is most current on disk, data or parity, to reestablish data consistency.

Of course, bitmaps used for this purpose do not have to have this particular format. For example, depending on the implementation, a bitmap 305 may include a greater or smaller number of bits to track state. Also, note that not all values in the bitmap are sent by a controller 1; some are updated by the quorum device 24 to reflect the currency of each block, as noted above.

In another embodiment, the time indicators 412-414 in the bitmap 305 are replaced, for each stripe, by a set of counters which indicate the order in which the blocks in the stripe were written. More specifically, the currency information may include a separate counter field for each data block and each parity block in each stripe, where the value of each counter indicates the order in which the corresponding block was written for that stripe. Therefore, the number of bits needed to implement each counter depends on the total number of blocks per stripe (including data and parity blocks). For a stripe with eight total blocks, e.g., six data blocks and two parity blocks as described above, a three-bit counter field is required for each block, to represent eight possible sequence values. The counter fields for each stripe are reset/rewritten any time a block in the stripe is rewritten.

In yet another embodiment, instead of using time indicators 412-414 or counters as currency information, a separate set of "sub-bitmaps" is included in (or associated with) the main bitmap 305 for each stripe, for that purpose. More specifically, for each stripe, a separate sub-bitmap is provided for each parity block in the stripe. Hence, if each stripe includes two parity blocks, then the bitmap 305 will have two such sub-bitmaps for each stripe. Each sub-bitmap includes a separate value (field) for each data block in the stripe, to indicate whether the data block or the parity block is more current. The sub-bitmap, therefore, essentially provides a pointer to the last updated block(s) in the stripe.

For example, if each stripe has M data blocks, D1 through DM, and two parity blocks P1 and P2, then for each stripe the bitmap 305 can include (or be associated with) two sub-bitmaps as follows:

Sub-bitmap for P1: P1/D1, P1/D2, . . . , P1/DM
Sub-bitmap for P2: P2/D1, P2/D2, . . . , P2/DM where the value of Pi/Dj indicates whether Pi has been updated to reflect the last write to Dj (i=1, 2, . . . , M and j=1 or 2 in this example). For example, the value of P2/D1 indicates whether P2 has been updated to reflect the last write of D1, and so forth.

Each such value (P1/D1, etc.) can be a single bit. Each such value is set at the beginning of any write operation that affects the corresponding data block and is cleared only when the corresponding parity block (e.g., P1 or P2) has been updated to reflect the write to the data block. A value of "0" can be used to indicate that the parity block was updated when the data block was last written (i.e., parity is "clean") while a "1" represents that the parity block has not been updated when the data block was last written (parity is "dirty"). This information can be used in the event of a failure or incomplete write, to determine whether data and/or parity are correct as stored on disk.

For example, assume a write to a single data block, D3, is to be performed in a given stripe. In that case, the fields in the main bitmap 305 corresponding to D3, P1 and P2 all will initially be marked dirty. In addition, the values P1/D3 and P2/D3 for that stripe will also initially be marked dirty.

If the write to D3 and the associated update of P1 succeed but the update of P2 fails, then D3 and P1 will be marked clean in the main bitmap 305, but P2 will remain dirty. In addition, the value P1/D3 will be cleared to "0" to indicate that P1 has been updated to reflect the write to D3; however, the value P2/D3 will still be at "1", indicating that P2 has not been updated to reflect the write to D3. Recovery from this type of situation is discussed below in connection with FIG. 7.

Figure 6:
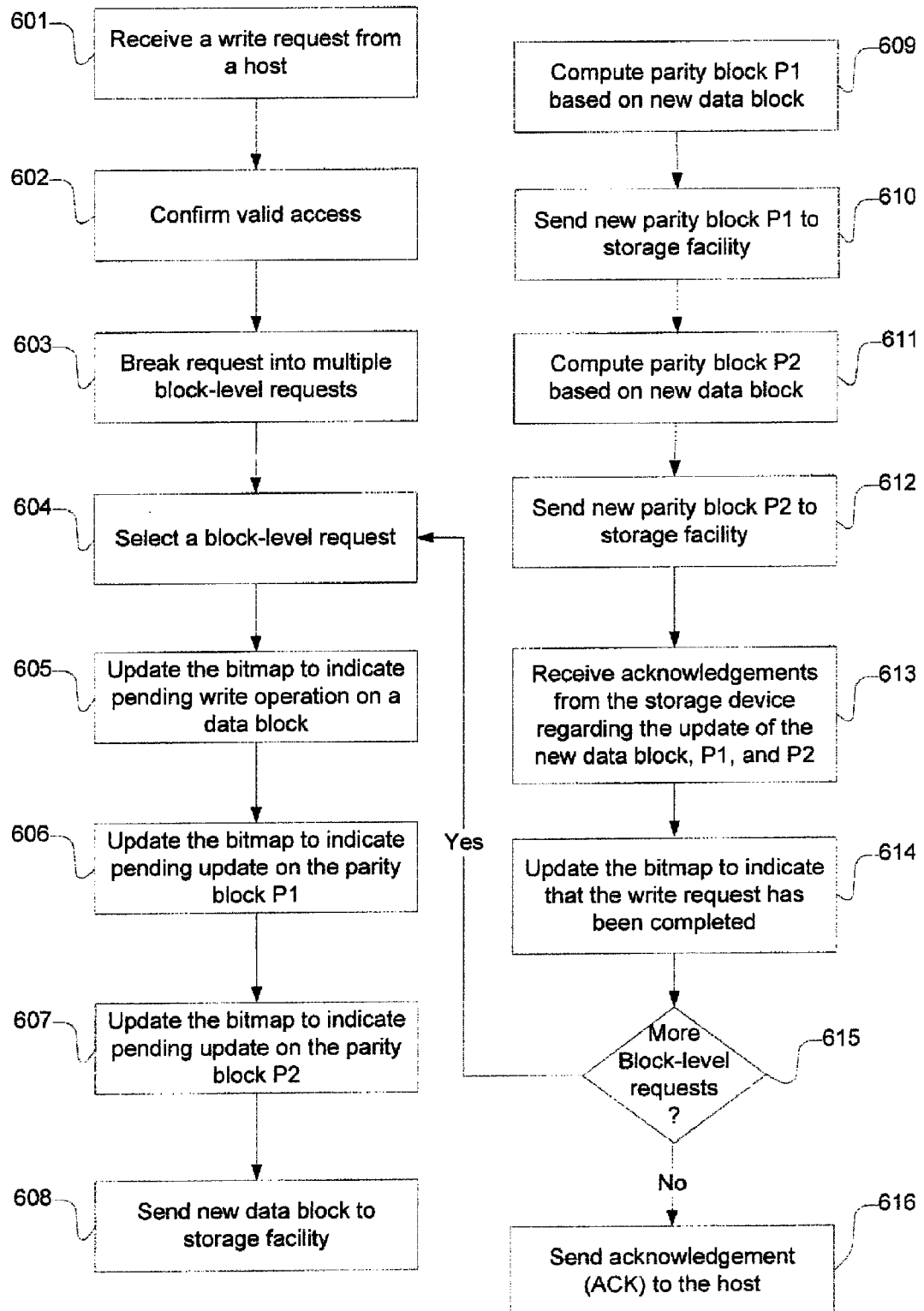
FIG. 6 is a flow diagram illustrating a process of handling a write operation at a controller, according to an embodiment of the present invention.

FIG. 6 is a flow diagram illustrating a normal process by which a controller 1 performs a write operation, including updating information maintained in the quorum device 24, according to an embodiment of the present invention. At step 601, the controller 1 receives a write request from a host 5. At step 602, the controller 1 determines whether the host 5 has authorization to access the target block(s). In one embodiment, the controller 1 maintains an access control list (ACL) for this purpose. The ACL specifies whether a host 5 has the right to access various data blocks. Further, in one embodiment the controller 1 can access the header 400 of the bitmap 305 (shown in FIG. 5) to determine whether the requesting host 5 has access rights. If the requesting host 5 has access rights, the process goes to step 602.

At step 603 the controller 1 breaks the write request into one or more block-level write requests (assuming the request was not already in such format) and then processes each of the block-level write requests one by one, according to steps 604 through 614. In other embodiments, the write request from the host 5 may already specify a particular target block.

The controller 1 first selects one of the block-level write requests to process at step 604. At step 605, the controller 1 then updates the bitmap (e.g., bitmap 305 shown in FIG. 5) in the quorum device 24 to indicate that a write operation on the target block is pending. In one embodiment, the controller 1 sets the particular bit (D1, D2 . . . , D6) which corresponds to the target block to "1". Next, at step 606, the controller 1 updates the bitmap to indicate that an update of the parity block P1 is pending. In one embodiment, the controller 1 sets the bit corresponding to P1 in the bitmap to "1". At step 607, the controller 1 then updates the bitmap to indicate that an update on the parity block P2 is pending, e.g., by setting the bit corresponding to P2 in the bitmap to "1". At step 608, the controller 1 sends the new (updated) data block to the storage facility 2. After receiving the new data block, the storage facility 2 stores the new data block and returns an acknowledgement to the controller 1. At step 609, the controller 1 computes the parity block P1 based on the new data block. At step 610, the controller 1 sends the new parity block P1 to the storage facility. At step 611, the controller 1 computes the parity block P2 based on the new data block. At step 612, the controller 1 sends the new parity block P2 to the storage facility 2. In one embodiment, P1 is calculated as an XOR operation on the data blocks of the corresponding stripe, whereas P2 is calculated by using Reed-Solomon operation on the data blocks of the corresponding stripe.

Assuming neither controller 1 nor the storage facility 2 fails, then after the storage facility 2 performs the update of the data block D, the parity block P1, and the parity block P2, the storage facility 2 sends acknowledgements of those actions back to the controller 1. Thus, in the normal course of operation of a storage system such as shown in FIG. 2, at step 613, the controller 1 receives acknowledgements from the storage facility 1 indicating the success of the updates. Then at step 614, the controller 1 updates the bitmap in the quorum device 24 to indicate that the block-level write request has completed. In one embodiment, the controller 1 does this by clearing the bits corresponding to D, P1 and P2 in the bitmap (i.e., sets them "clean"). The controller 1 then repeats steps 604 through 614 for another one of the block-level write requests until (step 615) all of the block-level write requests have been completed.

Finally, after all of the block-level write requests have been completed, at step 616 the controller 1 sends an acknowledgement ("ACK") to the host 5 that initiated the write request, indicating completion of the host-initiated write request.

Note that in contrast with the prior technique which used NVLogs in each controller, with this technique no write requests or actual data need to be communicated between controllers to provide redundancy. Rather, simple bitmap updates are communicated between the affected controller 1 and the quorum device 24, which involves much less data transfer. No communication is required between any of the storage controllers to maintain the bitmap or to recover from a write failure. Consequently, no matter how many redundant controllers are added to a cluster, the amount of inter-node data traffic does not increase.

Consider the following stripe as an example (note that physical arrangement of blocks may vary on storage devices):

D1 D2 D3 D4 D5 D6 P1 P2 where each Di is a data block (i=1, 2, ... 6) and each Pj is a parity block (j=1 or 2). If D1 is updated in response to a write request, then P1 and P2 need to be updated also. If all blocks are updated in sequence, then an acknowledgement is sent by the controller 1 to the host that initiated the write request. If for some reason (e.g., a controller failure) D1 is updated, but not one or both of the parity blocks, then the parity blocks can be recalculated based on the data blocks. Similarly, if one or both of the parity blocks are updated but D1 is not, then D1 can be reconstructed based on the updated parity block or blocks. In any case, an acknowledgement ("ACK") can be sent to the initiating host as soon as enough blocks in the stripe have been updated so that any remaining blocks in the stripe for which updates are still pending can be recovered (i.e., by parity based reconstruction).

If a controller 1 fails while performing a write operation, such that the write fails to complete (i.e., not all target blocks get successfully updated in a storage facility 2), then a different controller can take over to complete the write operation. In certain situations, however, it is necessary to determine for a given stripe which is more current, the data or parity. For example, this knowledge is important if a failure occurs while processing multiple write requests to the same stripe, and at least one write but not all of them has been acknowledged to the host before the failure occurred, then some data in the stripe may be dirty. In that event, it is necessary to determine which is most current on disk, data or parity, to reestablish data consistency.

Figure 7:
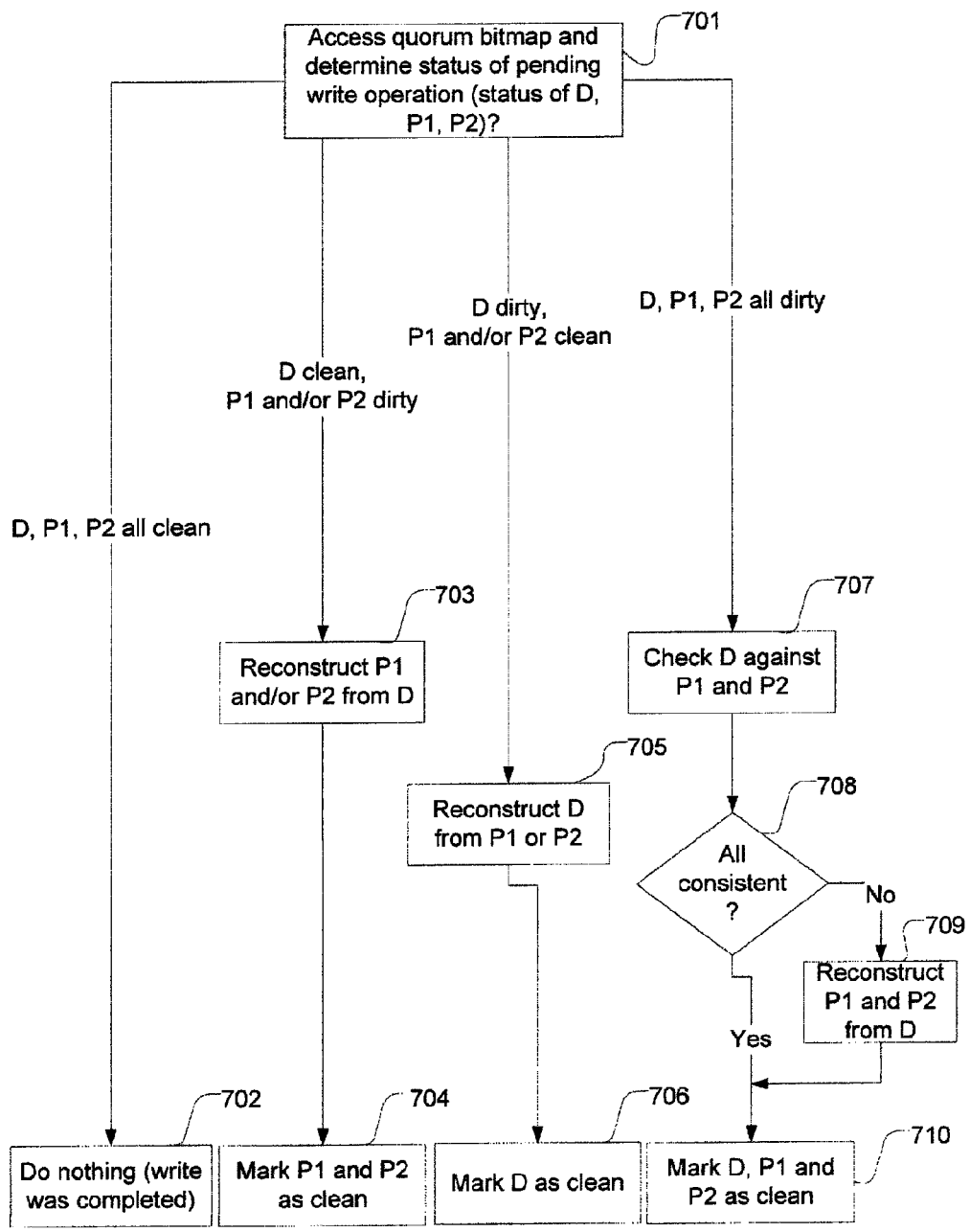
FIG. 7 is a flow diagram illustrating a process of a controller reestablishing data consistency after a failure, according to an embodiment of the present invention.

FIG. 7 is a flow diagram illustrating a failure recovery process, by which a controller 1 can reestablish data consistency (or verify it, as the case may be) after another controller has failed. To simplify description, the process is described with respect to only a single data block, D, and two parity blocks, P1 and P2.

At step 701, the controller accesses the relevant bitmap 305 stored in the quorum device 24 to determine the status of the relevant stripe. In particular, the controller checks the status of the fields corresponding to D, P1 and P2 in the bitmap and the corresponding currency information relating to those blocks. As described above, the currency information may be in the form of time indicator fields 412-414 (FIG. 5), counters, or sub-bitmaps, for example.

If D, P1 and P2 are all indicated as clean, then the controller does nothing (step 702), since this means that the write was completed and has been acknowledged to the host. If D is indicated as clean but P1 and/or P2 are dirty (i.e., P1 and/or P2 has not been updated to reflect the write to D), then the controller reconstructs the dirty parity block or blocks from the data blocks in the stripe at step 703. The controller then marks P1 and P2 as clean at step 704.

If D is indicated as dirty and P1 and/or P2 is clean (i.e., P1 and/or P2 is current, but D is not), then at step 705 the controller reconstructs the data block D from whichever parity block is clean (up-to-date). This situation most likely will occur during a failure of one disk in the storage facility. The controller then marks D as clean at step 706.

If D, P1 and P2 are all indicated as dirty (which means that the write was never acknowledged to the host), then at step 707 the controller will check D against P1 and P2 for consistency. If all of these blocks are consistent with each other (step 708), then the controller simply marks D, P1 and P2 a clean at step 710. If any of D, P1 or P2 is inconsistent with any of the others, then D is assumed to be correct, so the controller reconstructs P1 and P2 from D at step 709, and then marks D, P1 and P2 a clean at step 710.

Figure 8:
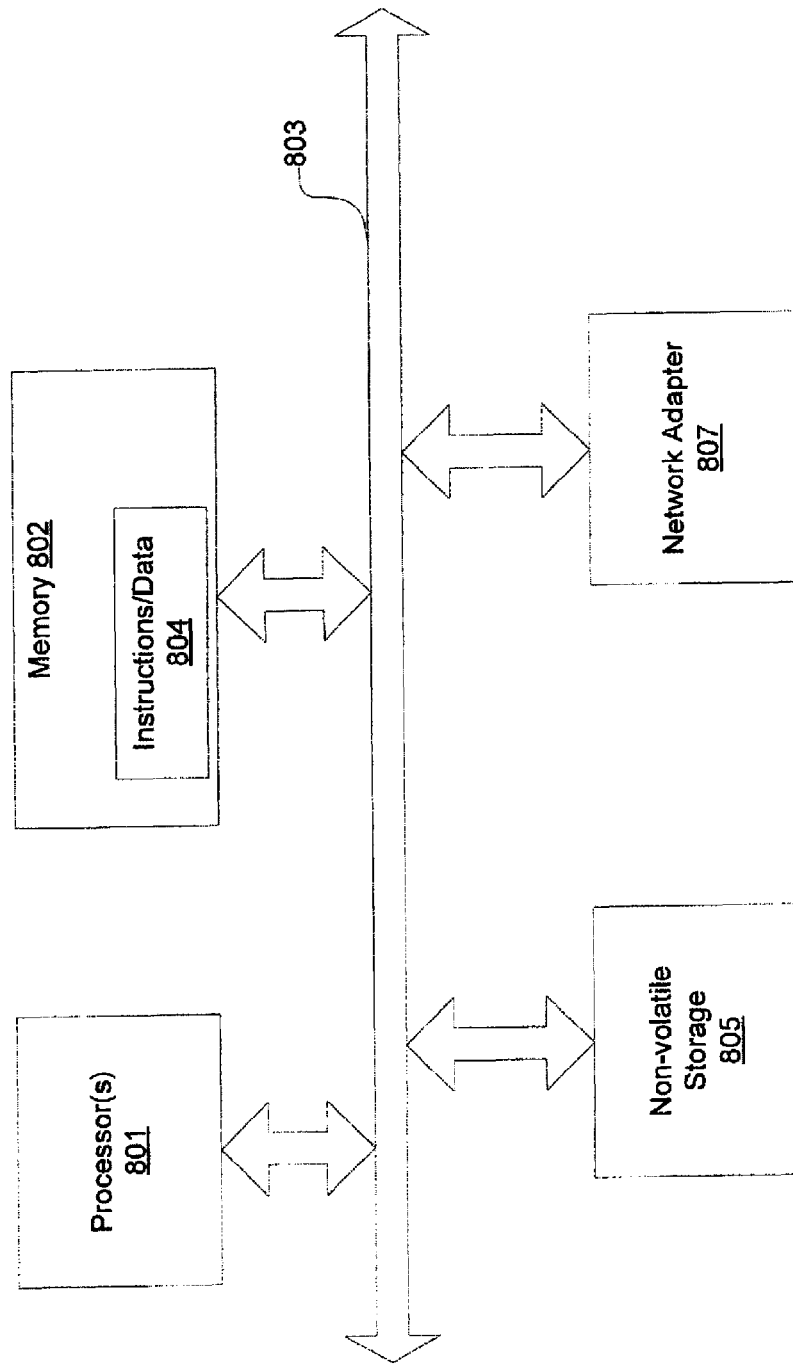
FIG. 8 is a high level block diagram of a processing system that may be used to implement a quorum device in accordance with the present invention.

FIG. 8 is a high level block diagram of a processing system that can be used to implement a quorum device 24, a controller 1 or a host 5. Certain standard and well-known components which are not germane to the present invention are not shown.

In the illustrated embodiment, the processing system includes one or more processors 801 coupled to a bus system 803. The bus system 803 in FIG. 8 is an abstraction that represents any one or more separate physical buses and/or point-to-point connections, connected by appropriate bridges, adapters and/or controllers. The bus system 803, therefore, may include, for example, a system bus, a form of Peripheral Component Interconnect (PCI) bus, HyperTransport or industry standard architecture (ISA) bus, small computer system interface (SCSI) bus, universal serial bus (USB), or Institute of Electrical and Electronics Engineers (IEEE) standard 1394 bus (sometimes referred to as "Firewire").

In the case of a quorum device 24, the processor(s) 801 may be (or may include) a memory controller. In the case of a controller 1 or host 5, the processor(s) 801 are the central processing unit (CPU) of the processing system and, thus, control the overall operation of processing system. In certain embodiments, the processor(s) 801 accomplish this by executing software stored in memory 802. A processor 801 may be, or may include, one or more programmable general-purpose or special-purpose microprocessors, digital signal processors (DSPs), programmable controllers, application specific integrated circuits (ASICs), field-programmable gate arrays (FPGAs), programmable logic devices (PLDs), or the like, or a combination of such devices.

Note that in another embodiment, a quorum device 24 does not include its own internal processor(s) 801. In such an embodiment, the memory (e.g., NVRAM) within the quorum device 24 may be directly accessible to external devices such as the controllers 1 in the cluster, by using, for example, RDMA.

The processing system also includes memory 802 coupled to the bus system 803. The memory 802 represents any form of random access memory (RAM), read-only memory (ROM), flash memory, or a combination thereof. Memory 802 stores software/firmware instructions and/or data 804, such as instructions and/or data to implement the techniques introduced above, including (in the case of a quorum device 24) the boot code of the quorum device 24.

Also connected to the processors 801 through the bus system 803 are a non-volatile storage device 805 and a network adapter 807. The non-volatile storage device 805 may be or include any conventional medium for storing data in a non-volatile manner, such as one or more disks. In a quorum device 24, the non-volatile storage device 805 may be or may include NVRAM to store the bitmap and cluster state information as described above (see FIG. 3). A quorum device 24 may also include other forms of non-volatile memory, such as flash and/or disk, to be used to store initialization code and/or information that may need to be saved in the event of a reboot.

The network adapter 807 provides the processing system with the ability to communicate with other devices over a network and may be, for example, an Ethernet adapter, a Fibre Channel adapter, InfiniBand adapter, or the like.

In the case of a controller 1, the processing system may also include a storage adapter (not shown), which allows the processing system to access external storage devices, such as a storage device 2.

Thus, a method and system of using disk-less quorum device in a clustered storage system have been described.

Software to implement the technique introduced here may be stored on a machine-readable medium. A "machine-accessible medium", as the term is used herein, includes any mechanism that provides (i.e., stores and/or transmits) information in a form accessible by a machine (e.g., a computer, network device, personal digital assistant (PDA), manufacturing tool, any device with a set of one or more processors, etc.). For example, a machine-accessible medium includes recordable/non-recordable media (e.g., read-only memory (ROM); random access memory (RAM); magnetic disk storage media; optical storage media; flash memory devices; etc.), etc.

"Logic", as is used herein, may include, for example, software, hardware and/or combinations of hardware and software.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
   detecting a failure in a clustered storage system which includes a plurality of storage controllers configured as failover partners, said failure having caused a write operation by a first storage controller of the plurality of storage controllers to fail to complete, the write operation having been initiated in response to a write request from a host, the write request requesting that a set of data be written;
   maintaining, in a memory that is external to the plurality of storage controllers, a shared instance of write status information, wherein each storage controller is able to access and update said write status information; and
   completing the write operation from a second storage controller of the plurality of storage controllers using said write status information, wherein a log of the set of data is not used to complete the write operation, and wherein no communication is required between the storage controller and the second storage controller to complete the write operation.

2. A method as recited in claim 1,
   wherein said write status information is about a plurality of write operations initiated by a plurality of hosts, wherein no communication is required between any of the storage controllers to maintain said write status information.

3. A method as recited in claim 2, wherein said maintaining write status information comprises:
   updating a data structure in the memory to reflect a current status of each of the plurality of write operations, the data structure including a separate data unit for each of a plurality of storage blocks in a storage facility, wherein a state of each said data unit indicates whether a write operation is pending for the corresponding storage block.

4. A method as recited in claim 3, wherein said updating the data structures comprises:
   in response to a request to perform a write operation, setting a data unit in the data structure to a first value to indicate that the write operation is pending for a storage block that corresponds to the data unit; and
   in response to acknowledgement that the write operation is complete, setting the data unit in the data structure to a second value to indicate that the write operation is not pending for the storage block that corresponds to the data unit.

5. A method as recited in claim 3, wherein the data structure is a bitmap, and each of said data unit including one or more bits in the bitmap.

6. A method as recited in claim 3, further comprising:
   maintaining cluster status information in a said memory.

7. A method as recited in claim 6, wherein the memory is a non-disk based memory.

8. A method as recited in claim 7, wherein the memory is a non-volatile random access memory (NVRAM).

9. A method as recited in claim 2, wherein said maintaining write status information comprises:
   maintaining currency information that indicates whether a data block or a parity block corresponding to the data block is more current.

10. A method for use in a clustered storage system that includes a plurality of storage controllers and a storage facility accessible to the plurality of controllers, the method comprising:
    accessing a shared data structure stored in a memory which is external to all of the storage controllers, each storage controller having the ability to access and update said shared data structure, the shared data structure including a separate data unit for each of a plurality of storage blocks in the storage facility, wherein a state of each said data unit indicates whether a write operation is pending for the corresponding storage block;
    in response to a write request from a host, setting a data unit in the data structure to a first value to indicate that a write operation is pending for a storage block that corresponds to the data unit; and
    in response to an acknowledgement that the write operation has been completed, setting the data unit in the data structure to a second value, to indicated that a write operation is not pending for the storage block that corresponds to a said data unit.

11. A method as recited in claim 10, further comprising:
    in response to a failure in a clustered storage system, using the data structure to recover from the failure.

12. A method as recited in claim 11, wherein the data structure includes a currency information that indicated whether a data block parity block corresponding to the data block is a more current.

13. A method as recited in claim 12, wherein using the data structure to recover from the failure comprises:
    examining the currency information to determine whether the data block or the parity block is more current;
    if the currency information indicated that the parity block is more current than the data block, then reconstructing the data block based on the parity block.

14. A method as recited in claim 11, further comprising:
    maintaining cluster status information in the memory.

15. A method as recited in claim 10, wherein the data structure is a bitmap, and each said unit is a predetermined number of bits of the bitmap.

16. A storage controller configured for use in a cluster storage system that includes a plurality of storage controllers and a storage facility accessible to the plurality of storage controllers, said storage controller comprising:
   a processor;
   a network adapter through which the controller is able to communicate with a host;
   a memory storing instructions which, when executed by the processor, cause the storage controller to perform a process which includes:
      accessing a shared data structure stored in a memory which is external to all the storage controllers, each storage controller having the ability to access and update said shared data structure, the shared data structure including a separate data unit for each of a plurality of storage blocks in the storage facility, a state of each said data unit indicating whether a write operation is pending for the corresponding storage block;
      in response to a write request from the host, setting a data unit in the data structure to a first value to indicate that a write operation is pending for a storage block that corresponds to the data unit; and
      in response to an acknowledgement that the write operation has been completed, setting the data unit in the data structure to a second value to indicate that a write operation is not pending for the storage block that corresponds to said data unit.

17. A storage controller as recited in claim 16, wherein said process further comprises:
   in response to a failure in the clustered storage system which causes a write operation to fail to complete, using the data structure to recover form the failure.

18. A storage controller as recited in a claim 16, wherein said process further comprises:
   examining currency information stored in said memory which is external to all of the storage controllers, to determine whether a data block or a parity block corresponding to the data block is more current;
   if the currency information indicates that the data block is more current than the parity block, then recomputing the parity block based on the data block; and
   if the currency information indicates that the parity block is more current than the data block, then reconstructing the data block based on the parity block.

19. A storage controller as recited in claim 18, wherein said process further comprises:
   maintaining cluster status information in the memory.

20. A storage controller as recited in claim 18, wherein the data structure is a bitmap, and each said data unit includes one or more bits of the bitmap.

21. A quorum device comprising:
   a memory to store a shared data structure corresponding to a storage facility in a clustered storage system, the data structure including a separate data unit for each of a plurality of storage blocks in the storage facility, each said data unit indicating whether a write operation is pending for the corresponding storage block; and
   a network interface through which updates of the data structure are received from a plurality of storage controllers that can access said storage facility, wherein each storage controller has the ability to access and update said shared data structure, and wherein the storage controllers are external to said quorum device.

22. A quorum device as recited in a claim 21, wherein the memory further is to store cluster state information for the cluster.

23. A quorum device as recited in claim 22, wherein the memory is a non-disk based memory.

24. A quorum device as recited in claim 23, wherein the memory is a non-volatile random access memory (NVRAM).

25. A quorum device as recited in claim 21, wherein:
   the data structure is a bitmap, and each said data unit is a predetermined number of bits of the bitmap;
   the memory is a non-volatile random access memory (NVRAM);
   the memory further is to store cluster state information; and
   the plurality of storage blocks of the storage facility include data blocks and the parity blocks, such that some data units in the data structure represent said data blocks and other data units in the bitmap represent said parity blocks.

* * * * *